United States Patent
Kickingereder et al.

(10) Patent No.: US 12,510,352 B2
(45) Date of Patent: Dec. 30, 2025

(54) METHOD AND SYSTEM FOR OPTICALLY MEASURING AN OBJECT HAVING A SPECULAR AND/OR PARTIALLY SPECULAR SURFACE AND CORRESPONDING MEASURING ARRANGEMENT

(71) Applicant: MICRO-EPSILON MESSTECHNIK GMBH & CO. KG, Ortenburg (DE)

(72) Inventors: Reiner Kickingereder, Ortenburg (DE); Alexander Zimmermann, Aholming (DE); Christian Faber, Ergolding (DE); Hanning Liang, Erlangen (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 476 days.

(21) Appl. No.: 17/596,400

(22) PCT Filed: Apr. 29, 2020

(86) PCT No.: PCT/DE2020/200029
§ 371 (c)(1),
(2) Date: Dec. 9, 2021

(87) PCT Pub. No.: WO2020/249166
PCT Pub. Date: Dec. 17, 2020

(65) Prior Publication Data
US 2023/0083039 A1    Mar. 16, 2023

(30) Foreign Application Priority Data
Jun. 11, 2019  (DE) ................ 10 2019 208 474.5

(51) Int. Cl.
*G06K 9/00*  (2022.01)
*G01B 11/25* (2006.01)
(Continued)

(52) U.S. Cl.
CPC ................ *G01B 11/25* (2013.01); *G06T 7/60* (2013.01); *G06V 10/60* (2022.01); *G06T 2207/10024* (2013.01)

(58) Field of Classification Search
CPC . G01B 11/25; G06T 7/60; G06T 2207/10024; G06V 10/60
See application file for complete search history.

(56) References Cited

U.S. PATENT DOCUMENTS 6,392,754 B1   5/2002  Pingel et al.
8,064,069 B2 * 11/2011  Wienand ................ G01B 11/25
                                                   356/612

(Continued)

FOREIGN PATENT DOCUMENTS

DE    19643018 A1   4/1998
DE    10014964 A1   1/2001
(Continued)

OTHER PUBLICATIONS 3D acquisition of mirroring objects using striped patterns, Marco Tarini et al., Elsevier, 2002, pp. 233-259 (Year: 2002).*

(Continued)

*Primary Examiner* — Jayesh A Patel
(74) *Attorney, Agent, or Firm* — Alston & Bird LLP (57) ABSTRACT

The invention relates to a method for optically measuring an object having a reflective and/or partially reflective surface. According to the invention, by means of a pattern generator (1), a planar pattern (13) is generated which is varied in at least one optical property such that, at least in partial regions (10), a plurality of different points (p) or a plurality of different groups of points are distinguishable from each other. At least parts of the pattern (13) are reflected by a reflective surface (2) of the object (3) as a reflected pattern onto a detector (14) of a camera unit (4), wherein the reflected pattern is converted by the detector (14) into a (Continued)

camera image (9). A connection between points (q) of the camera image (9) and corresponding points (p) of the pattern (13) can be described by means of a correspondence function which is dependent on geometric properties of the reflective surface (2) of the object (3). At least one of the geometric properties of the reflective surface (2) of the object (3) is determined by using differential geometric properties of a transformation given by the correspondence function. The invention furthermore relates to a corresponding system and a corresponding measuring arrangement.

20 Claims, 7 Drawing Sheets (51) Int. Cl.
*G06T 7/60* (2017.01)
*G06V 10/60* (2022.01)

(56) References Cited

U.S. PATENT DOCUMENTS

| | | | | |
|---|---|---|---|---|
| 8,284,392 | B2* | 10/2012 | Lampalzer | G01B 11/2513 356/237.1 |
| 2004/0246497 | A1* | 12/2004 | Chambard | G01B 11/2504 356/612 |
| 2005/0238237 | A1* | 10/2005 | Haeusler | G01B 11/2545 382/203 |
| 2010/0060905 | A1* | 3/2010 | Wienand | G01B 11/25 356/612 |
| 2010/0214406 | A1* | 8/2010 | Potapenko | G01B 11/2513 348/135 |
| 2010/0315422 | A1* | 12/2010 | Andre | G01B 11/2513 345/426 |
| 2013/0070087 | A1 | 3/2013 | Potapenko | |
| 2015/0292863 | A1* | 10/2015 | Furihata | H04N 23/62 348/135 |
| 2016/0379380 | A1 | 12/2016 | Addington et al. | |
| 2017/0199028 | A1* | 7/2017 | Tin | G01B 11/22 |
| 2019/0056218 | A1* | 2/2019 | Ulmer | G01B 11/005 |
| 2020/0204714 | A1* | 6/2020 | Takayama | G06T 7/0004 |

FOREIGN PATENT DOCUMENTS

| | | | | |
|---|---|---|---|---|
| DE | 19944354 | A1 | 4/2001 | |
| DE | 102004020419 | B3 | 10/2005 | |
| DE | 102005044912 | A1 | 4/2007 | |
| EP | 1837623 | A1 * | 9/2007 | G01B 11/25 |
| EP | 3171129 | A1 * | 5/2017 | G01B 11/00 |
| FR | 2830079 | A1 * | 3/2003 | G01B 11/2504 |
| FR | 3018603 | A1 * | 9/2015 | G01B 11/25 |
| JP | 07-35529 | A | 2/1995 | |
| JP | 2011-127936 | A | 6/2011 | |
| JP | 2015114309 | A * | 6/2015 | G01B 11/245 |
| WO | WO-0123833 | A1 * | 4/2001 | G01M 11/005 |
| WO | WO-2007115621 | A2 * | 10/2007 | G01B 11/25 |
| WO | WO-2010017884 | A1 * | 2/2010 | G01B 11/25 |
| WO | WO-2015169730 | A1 * | 11/2015 | G01B 11/2513 |
| WO | WO-2016209412 | A1 * | 12/2016 | G01B 11/254 |

OTHER PUBLICATIONS

General Specular Surface Triangulation, Thomas Bonfort et al, Springer, 2006, pp. 872-881 (Year: 2006).*
Non-stereoscopic Method for Deflectometric Measurement of Reflecting Surfaces, Eike Slogsnat et al, DGaO, 2009, pp. 1-2 (Year: 2009).*
Local Shape from Mirror Reflections, Silvio Savarese et al., Springer, 2005, pp. 31-67 (Year: 2006).*
Inspection of Specular and Partially Specular Surfaces, Stefan Werling et al., Pan, 2009, pp. 415-431 (Year: 2009).*
International Searching Authority, International Search Report and Written Opinion for International Application No. PCT/DE2020/200029, dated Aug. 18, 2020, European Patent Office, Rijswijk, Netherlands, (15 pages).
Salvi et al., *Pattern Codification Strategies in Structured Light Systems, Elsevier*, The Journal of the Pattern Recognition Society, Patter Recognition 37 (2004) 827-849.
Savarese et al., *Local Shape From Mirror Reflections*, International Journal of Computer Vision 64(1), 31-67, 2005.
Tarini et al., *3D Acquisition of Mirroring Objects Using Striped Patterns*, Elsevier, Graphical Models 67 (2005) 233-259, Available online at www.sciencedirect.com.
Slogsnat et al., *Non-stereoscopic Method for Deflectometric Measurement of Reflecting Surfaces*, DGaO Proceedings 2009, http://www.dgao-proceedings.de—ISSN:1614-8426 (2 pages).
Werling et al., *Deflecktometrie zur automatischen Sichtprüfüng und Rekonstruktion spiegelnder Oberflächen*, Karlsruhe, Deutschland, Jan. 1, 2011, Retrieved from the Internet: https://www.ksp.kit.edu/download/1000023287 [retrieved on Aug. 5, 2020] XP055720294—cited in the application at sections 7.1.2, 7.1.3.
Bonfort et al., *General Specular Surface Triangulation*, Proceedings of the 7th Asian Conference on Computer Vision—vol. Part 1, 872-882, Berlin Heidelberg, Springer-Verlag (2006) (11 pages).
Kaminski, Jürgen, *Geometrische Rekonstruktion Spiegelnder Oberflächen aus Deflektometrischen Messdaten*, Progress in Modern Optics, vol. 25, (2008), Lehrst. für Mikrocharakterisierung, Friedrich-Alexander-Univ. Erlangen-Nürnberg, ISBN: 3932392868, 9783932392863, (220 pages).
Knauer, Markus C. et al., "*Phase measuring deflectometry: a new approach to measure specular free-form surfaces*" Institute of Optics, Information and Photonics, University of Erlangen-Nuremberg, Germany, 2004 (11 pages).
International Searching Authority, International Preliminary Report on Patentability (IPRP) for International Application No. PCT/DE2020/200029, dated Dec. 14, 2021, International Bureau of WIPO (9 pages).

* cited by examiner

METHOD AND SYSTEM FOR OPTICALLY MEASURING AN OBJECT HAVING A SPECULAR AND/OR PARTIALLY SPECULAR SURFACE AND CORRESPONDING MEASURING ARRANGEMENT

CROSS REFERENCE TO RELATED APPLICATIONS

This application is a national stage application, filed under 35 U.S.C. § 371, of International Application No. PCT/DE2020/200029, filed Apr. 29, 2020, which international application claims priority to and the benefit of German Application No. 10 2019 208 474.5, filed Jun. 11, 2019; the contents of both of which as are hereby incorporated by reference in their entireties.

BACKGROUND

Technical Field

The invention relates to a method and system for optically measuring an object having a specular and/or partially specular surface and corresponding measuring arrangement.

These types of methods, systems and measuring arrangements are used in particular for full-surface optical measurement of the surface topography of objects having a specular or partially specular freeform surface. Applications can be found in the automotive industry (e.g., for painted body parts), in the optical industry (e.g., for the measurement of lenses and mirrors) or even in the consumer sector (e.g., for the measurement of cell phone and tablet displays), to name just a few application scenarios.

Description of Related Art

Phase-measuring deflectometry is an established and frequently used method for such measurements. The basics of said deflectometry are described in DE 199 44 354 A1. A usually sinusoidal fringe pattern is displayed on a calibrated screen and observed with one or more calibrated camera(s) over the specular surface of the object to be measured. Using appropriate phase evaluations in multiple directions, the coordinates of the observed pattern point in the plane of the screen can be inferred for each camera pixel. Under certain conditions the surface normal can be inferred by tracing the light ray of the camera's line of sight to the observed screen point and, after numerical integration, the shape of the observed object can be inferred as well.

A well-known problem with this method is the so-called height ambiguity: Since each camera pixel only contains information about the location of the observed screen point, but not about its beam direction, the surface normal can only be determined unambiguously when the position ("height") of the object is known. Consequently, different height assumptions result in correspondingly different surface normals. This ambiguity, also often referred to as the "regularization problem or height problem in deflectometry", can be resolved with a variety of approaches, all of which, however, have specific disadvantages.

In one approach, which is described in T. Bonfort et al. "General Specular Surface Triangulation", Proceedings of the 7th Asian Conference on Computer Vision—Volume Part I, 872-882, Berlin Heidelberg: Springer-Verlag (2006), the unknown beam direction is determined by means of a second measurement with a screen position shifted perpendicular to the plane of the screen. However, this requires a complex mechanism for shifting the screen, as well as a sophisticated calibration of the setup in both screen positions. This approach also prolongs the measurement time.

In another approach, the unknown object position can be determined by an absolute measurement at one point using an additional, independent measurement method. This measurement can be optical (for example using a triangulation sensor) or tactile. The unknown heights of other points of the surface can be determined to self-consistency on the basis of this one measured surface point by iterative integration of the surface normals calculated under the respective current height assumption. Such a procedure is described in E. Slogsnat et al. "Non-stereoscopic Method for Deflectometric Measurement of Reflecting Surfaces", Proc. DGaO 110 All (2009), for example. The disadvantage of this method is that an additional point-shaped height measurement has to be integrated into the setup and calibrated accordingly, which has an unfavorable effect on the cost and installation space of the apparatus.

EP 1 837 623 A1 describes a method especially for partially specular objects, in which the ambiguity is resolved by combining deflectometric measurement of the directionally reflected portion with a "shape from shading" evaluation of the diffusely reflected portion. However, this necessarily requires a sufficiently strong (partial) roughness of the surface to generate the required diffusely reflected portion, which is not the case with very smooth or completely shiny surfaces.

Another possibility for solving the above-described ambiguity is to assign a unique direction to each screen point independent of the respective object position. Such a method, known as direction coded deflectometry, is described in DE 100 14 964 A1, for example. Here, however, it is imperative that the screen is mapped to infinity and that the main rays for observing the object are parallel. The very large lens required to image the screen and the likewise required space-consuming and costly telecentric observation optics mean that this approach can usually not be used for practical application—in particular in the case of larger image fields and/or larger angular dynamics.

DE 10 2004 020 419 B3 shows that the ambiguity can also be resolved by observation with one or more additional cameras (so-called "stereo or absolute deflectometry"). The disadvantages here, however, are the greater complexity in terms of equipment and calibration, as well as the additionally required installation space. For this approach, it is also necessary that the image fields of the cameras overlap sufficiently. Good height resolution also requires a sufficiently large angle between the observation directions of the cameras involved, which necessitates either a very large screen or the use of multiple separate screens for each individual camera. In many practical applications, this is implementable only to a limited extent.

When working with only one camera (monocular view), the surface normal observed in one pixel can in principle be calculated for every (unknown) potential object height. This results in a so-called "vector field of potential normals" in the measurement volume. Under suitable continuity and differentiability assumptions of the object surface, it can be shown that, for certain geometries of the measurement setup, this vector field can be locally integrated only on the "real" object surface. One criterion for the local integrability is the "Frobenius condition". Such methods are disclosed in the dissertations of J. Kaminski "Geometrische Rekonstruktion spiegelder Oberflächen aus deflektometrischen Messdaten [Geometric reconstruction of specular surfaces from deflectometric measurement data]", University of Erlangen- Nuremberg (2008), for example, or S. B. Werling "Deflektometrie zur automatischen Sichtprüfung and Rekonstruktion spiegelder Oberflächen [Deflectometry for automatic visual inspection and reconstruction of specular surfaces]", Karlsruhe Institute of Technology (2011). Even though the height problem could theoretically be solved in this way with just one camera view, this approach is not practical, because, for typical structural geometries, the vector field of the potential normals varies only extremely slightly and with very low spatial frequency, as a result of which the deviation from the local integrability is usually not measurable in practice.

S. Savarese et al. "Local Shape from Mirror Reflections", International Journal of Computer Vision, 64(1), 31-67 (2005) describes a method of how to determine the differential geometric parameters of the object surface in zeroth (position/height), first (inclination/normal) and second order (II fundamental shape/curvature) in discrete points from the mapping of discrete intersecting curves on the screen. The straight edges of a binary checkerboard pattern with triangular or square fields are used as curves. The disadvantage of this method is that the information can only be evaluated at individual discrete (spatially separated) points, which are fixedly predetermined by the pattern. The location of these discrete measurement or support points on the (subsequently to be suitably interpolated) object surface furthermore depends on the shape of the object itself.

The underlying object of the present invention is to configure and further develop a method, a system and a measuring arrangement of the type mentioned at the outset in such a way as to enable optical measurement of an object over as full a surface as possible, while keeping the complexity in terms of equipment and the costs as low as possible.

BRIEF SUMMARY

The aforesaid object is achieved according to the invention by the features of Claim 1. In the method in question, a pattern generator is used to produce a two-dimensional pattern which is varied in at least one optical property such that, at least in subregions, a plurality of different points or a plurality of different groups of points can be distinguished from one another, wherein at least parts of the pattern are reflected by a reflective surface of the object as a reflected pattern onto a detector of a camera unit, wherein the reflected pattern is converted by the detector into a camera image, wherein a relationship between points of the camera image and corresponding points of the pattern can be described by means of a correspondence function which is dependent on geometric properties of the reflective surface of the object, and wherein at least one of the geometric properties of the reflective surface of the object is determined by using differential geometric properties of a transformation given by the correspondence function.

In terms of a system, the aforesaid object is achieved by the features of Claim 16. According to that, the system in question comprises:

a pattern generator for producing a two-dimensional pattern which is varied in at least one optical property such that, at least in subregions, a plurality of different points or a plurality of different groups of points can be distinguished from one another, a camera unit comprising a detector, wherein at least parts of the pattern are reflected by a reflective surface of the object as a reflected pattern onto a detector of the camera unit, wherein the detector is configured to convert the reflected pattern into a camera image, and wherein a relationship between points of the camera image and corresponding points of the pattern can be described by means of a correspondence function which is dependent on geometric properties of the reflective surface of the object, a calculation unit which is configured to determine at least one of the geometric properties of the reflective surface of the object using differential geometric properties of a transformation given by the correspondence function.

In terms of a measuring arrangement, the aforesaid object is achieved by the features of Claim 18.

BRIEF DESCRIPTION OF THE FIGURES

There are various ways to advantageously configure and further develop the teaching of the present invention. For this purpose, reference is made, on the one hand, to the subordinate claims of the ancillary claims and, on the other hand, to the following discussion of preferred design examples of the invention with the aid of the drawing. In connection with the discussion of the preferred design examples of the invention on the basis of the drawing, generally preferred configurations and further developments of the teaching are discussed as well. In the drawing, the figures show FIG. 1 a schematic illustration of a deflectometry system to demonstrate height ambiguity in deflectometry, FIG. 2 a first camera phase image obtained from a reflected pattern with a sinusoidal fringe profile in a first orientation, FIG. 3 a second camera phase image obtained from a reflected pattern with a sinusoidal fringe profile in a second orientation perpendicular to the first orientation, FIG. 4 a third camera phase image of a pattern reflected on a reflective surface of the object with an additive combination of the sinusoidal fringe patterns of FIGS. 2 and 3, FIG. 5 a schematic illustration of a sinusoidal cross pattern (FIG. 5A), a camera image (FIG. 5B), and a 3×3 surrounding area of a point of the camera image (FIG. 5C) to demonstrate the correspondence of curves in the camera image and in the pattern, and FIG. 6 a schematic illustration of a design example of a system according to the invention with a double sinusoidal pattern.

DETAILED DESCRIPTION OF VARIOUS EMBODIMENTS

Figure 1:
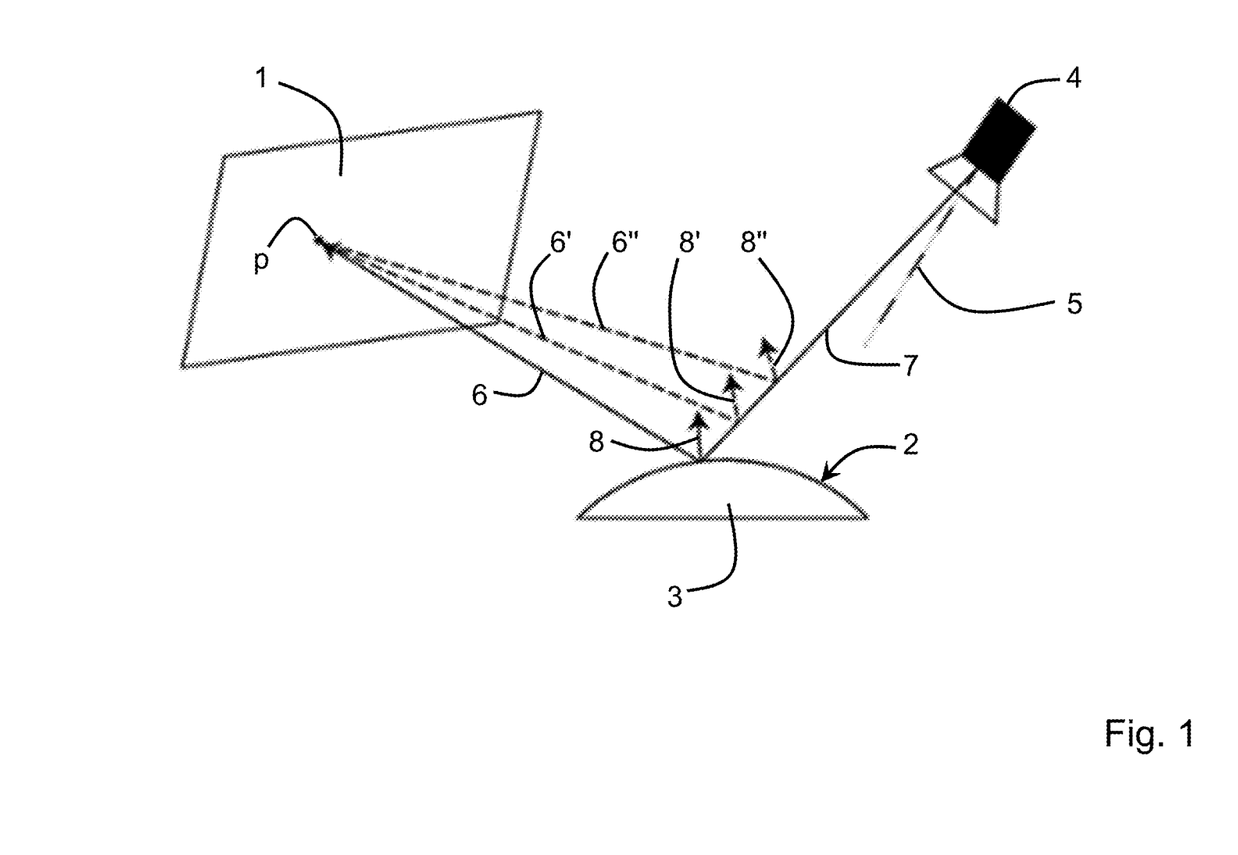

FIG. 1 shows a schematic illustration of a typical deflectometry situation. A pattern generator 1 produces a pattern which is reflected on a reflective surface 2 of an object 3 as a reflected pattern into a camera unit 4. A not-depicted detector of the camera unit 4 produces a camera image from the reflected pattern. A viewing axis of the camera (formed by the optical axis of the camera optics) is shown with the reference sign 5. A point q visible in the camera image, which has emerged from a point p of the pattern by reflection on the reflective surface 2, can be produced by various light rays, for which three different possibilities are drawn as examples in FIG. 1. Each one of the light rays 6, 6', 6" shown in FIG. 1 can produce a reflected light ray 7 and consequently an illuminated point q on the detector of the camera unit 4. Different heights result, depending on which one of the light rays 6, 6', 6" is correct. Since the angle of the incident light ray 6, 6', 6" relative to the surface normal and the angle of the reflected ray 7 relative to the surface normal are always the same, different surface normals 8, 8', 8" result depending on the correct light ray 6, 6', 6". It can be seen that this ambiguity has to be resolved in order to be able to correctly determine the geometric property "height" and "inclination" of the reflective surface 2.

Figure 2:
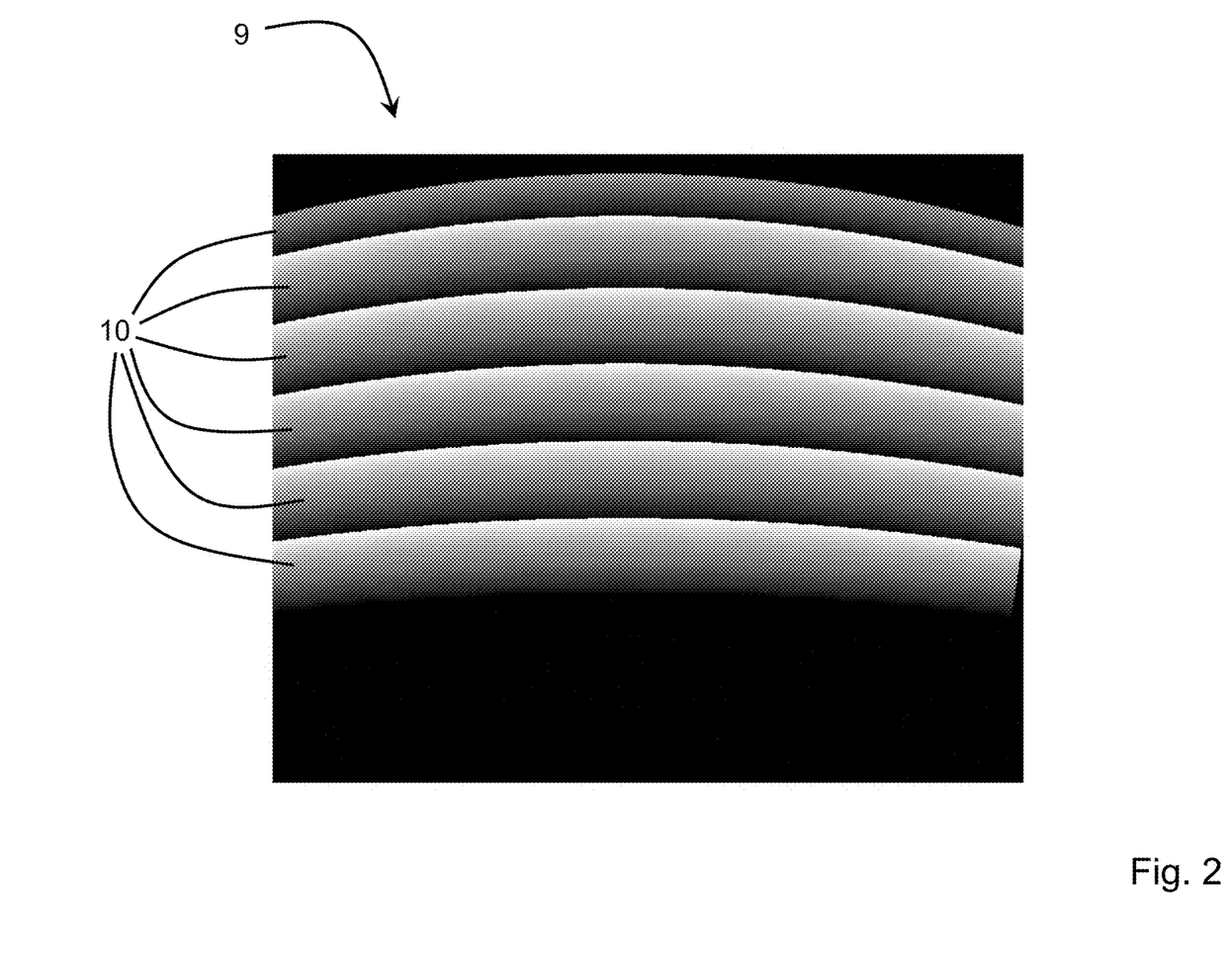
Figure 3:
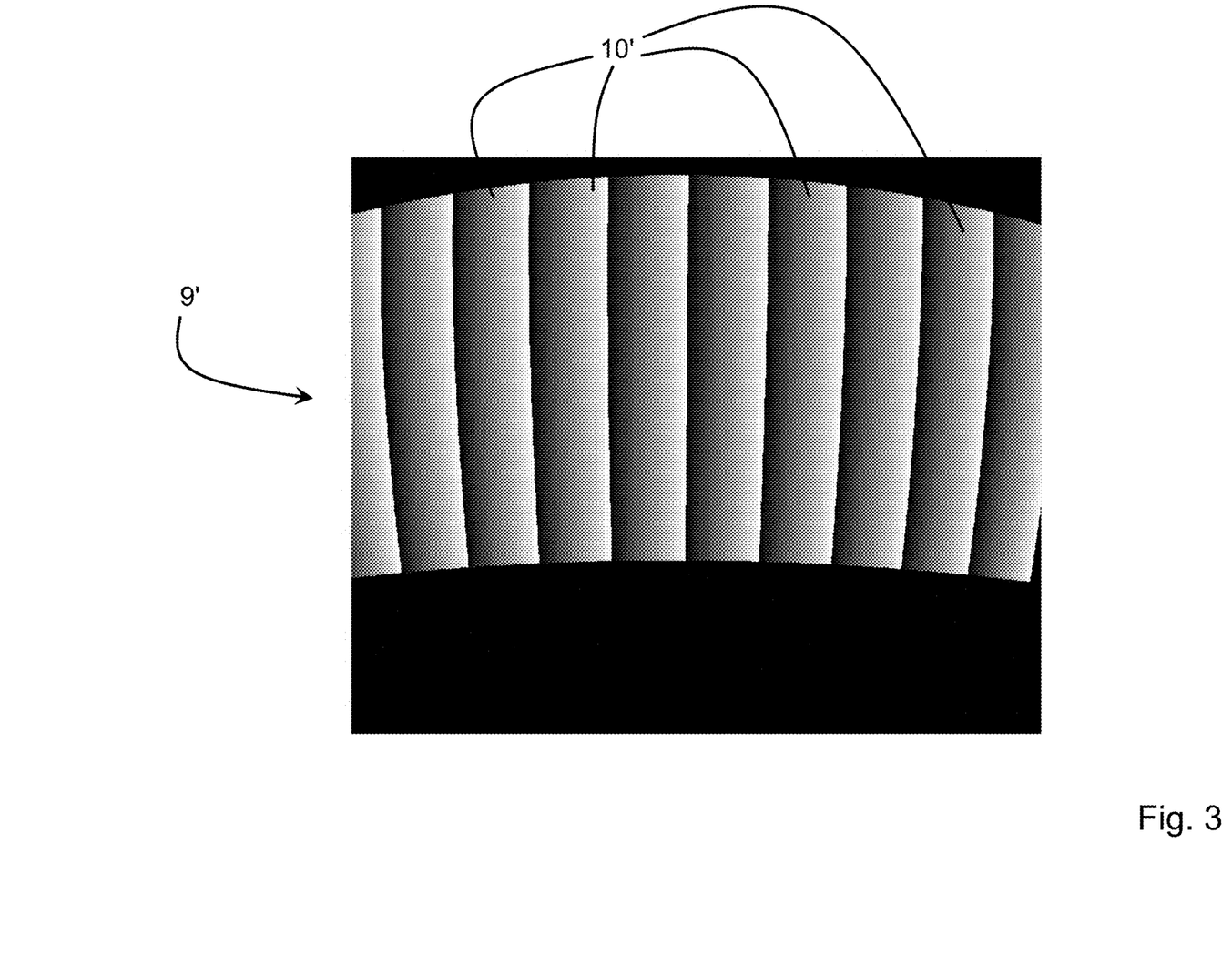
Figure 4:
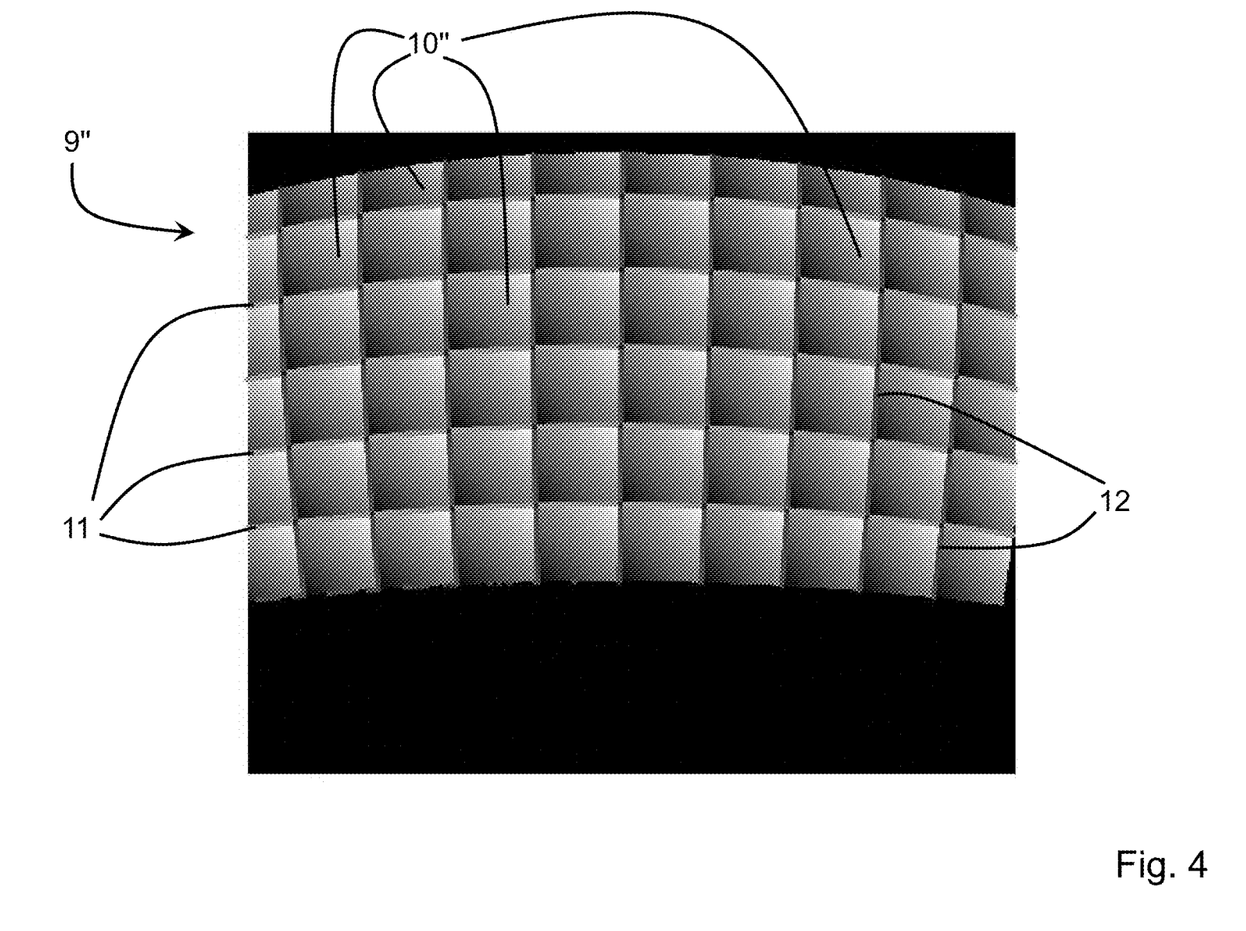

FIGS. 2 to 4 show different camera images 9, 9', 9" which, using the example of phase-measuring deflectometry, were created by reflecting a pattern produced by the pattern generator 1 on a slightly curved reflective surface 2 of an object 3. In FIG. 2, the camera image 9 is formed by horizontally aligned, curved stripes with a brightness curve as can be obtained from an originally sinusoidal brightness curve after a suitable phase evaluation. In FIG. 3, the pattern is rotated clockwise 90° to create vertical, curved stripes which have a brightness curve such as can be obtained from an originally sinusoidal brightness curve after a suitable phase evaluation. In FIG. 4, the two patterns of FIGS. 2 and 3 are combined, so that the camera image 9" forms a combination of stripes curved in horizontal direction and stripes curved in vertical direction. In addition, locations having the same phase 11, 12 are marked in color, whereby locations having the same phase 11 are shown in green in horizontal direction and locations having the same phase 12 are shown in red in vertical direction. In each of the shown camera images 9, 9', 9", subregions 11 are created, within which at least one optical property of the pattern, namely the phase of the respective sinusoidally varying brightness curve of the pattern, varies, so that a group of points, namely lines having the same phase, can be inferred on a camera image. All three camera images 9, 9', 9" can be used to determine geometric properties of the reflective surface using differential geometric properties of a transformation given by the correspondence function and thus to determine a point cloud that describes the structure of the surface.

Figure 5A:
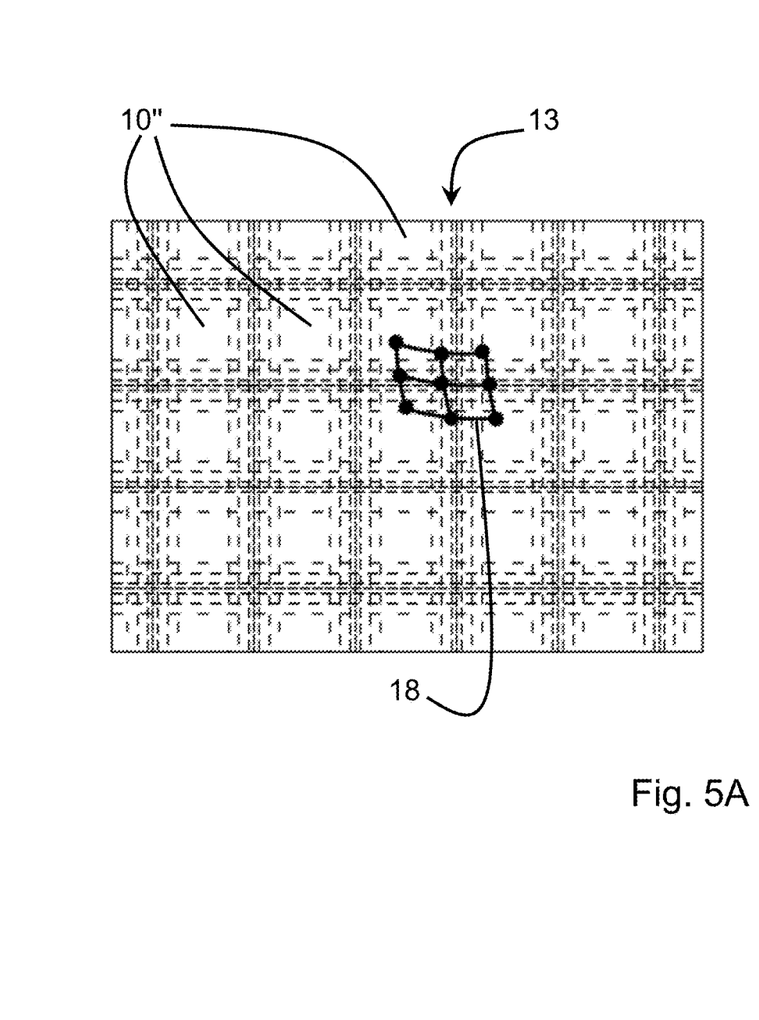
Figure 5B:
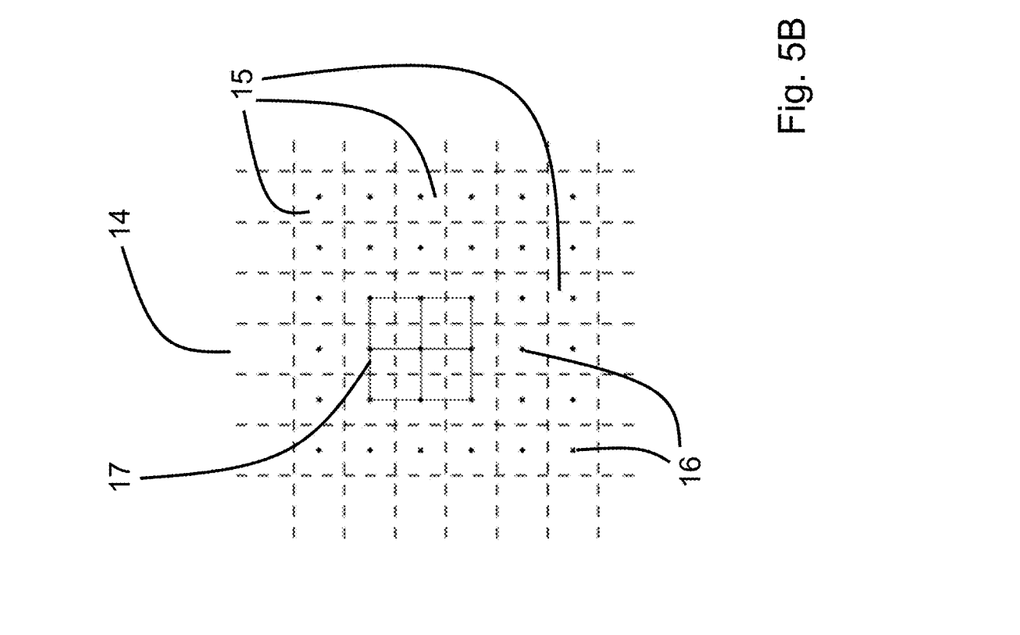
Figure 5C:
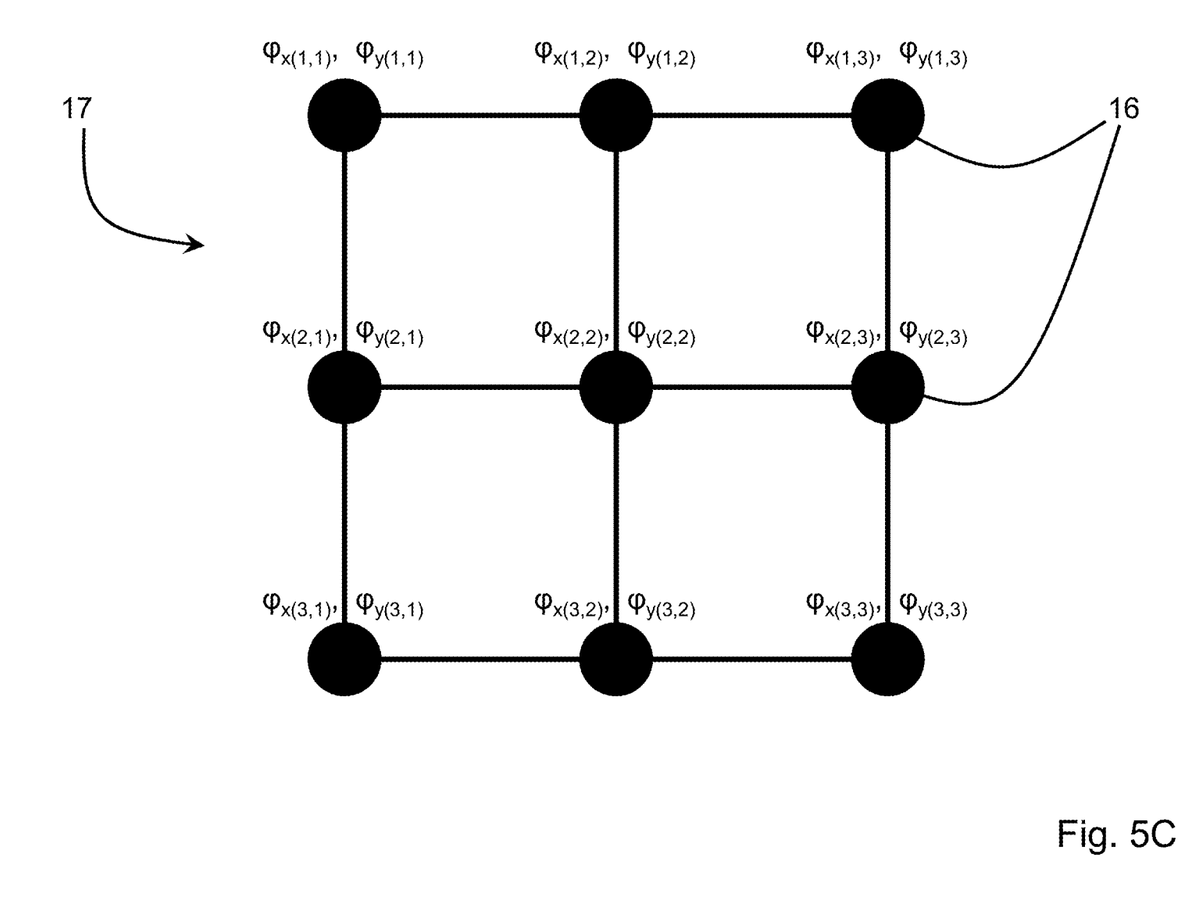

FIG. 5 shows that the correspondence function can be approximated locally in a surrounding area as a Taylor expansion. The original images of the correspondence function are arbitrarily arranged coordinate lines in the detector plane, the images are the resulting (usually curved) curves of the respective observed phase values φ on the screen. FIG. 5A shows a pattern 13 comprising multiple subregions 10" in a square grid. Within each subregion 10", there is a double sinusoidal curve of an optical property which, in this case, again consists of the brightness of the pattern points. Specifically, the double sinusoidal curve is two sinusoidal patterns which are offset 90° relative to one another and, after suitable phase evaluation, produce the camera image of FIG. 4. FIG. 5B schematically shows a section of a detector 14 of a camera unit 4, whereby the individual pixels 15 are localized by the center 16. FIG. 5B also includes a point p and its direct neighbors (3×3 surrounding area), whereby the altogether 9 points are respectively connected to one another by horizontal and vertical lines which form the curves 17 in the camera image. FIG. 5C shows this 3×3 surrounding area once more enlarged, whereby a variable $\varphi_{x(i,j)}, \varphi_{y(i,j)}$ for a matrix representation is drawn at each point. If a corresponding point of the pattern 13 is sought for each of the points of the 3×3 surrounding area, the curves 18 shown in FIG. 5A, for example, are obtained.

Figure 6:
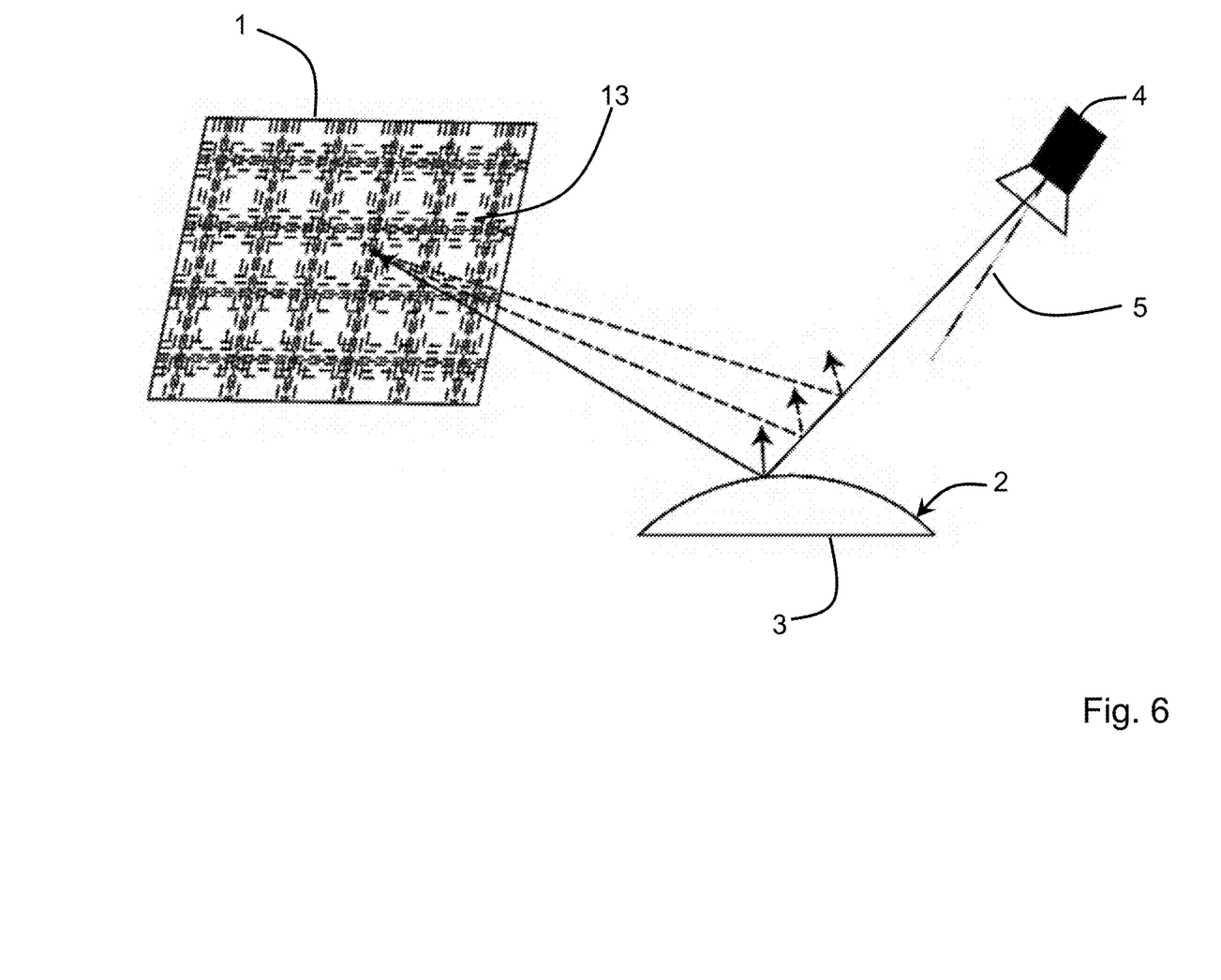

FIG. 6 shows the mapping geometry in the system according to the invention and corresponds in large part to the representation in FIG. 1. However, by using a specially configured pattern and by calculating differential geometric properties, the height ambiguities can now be eliminated.

In a manner according to the invention, it was first recognized that combining aspects of phase-measuring deflectometry to provide full-surface measurement data and differential geometric approaches described in the aforementioned publication of S. Savarese et al. "Local Shape from Mirror Reflections" for individual discrete points of intersection of intersecting curves enables an approach which allows a full-surface measurement of an object having a specular and/or partially specular surface with simultaneously low complexity in terms of equipment, in particular without the need to introduce additional cameras, additional measurement methods or shifting mechanisms. For this purpose, a two-dimensional pattern which is varied in its optical properties is produced by means of a pattern generator. The optical properties of the pattern are varied such that, at least in subregions of the pattern, a plurality of different points or a plurality of different groups of points can be distinguished from one another. This means that a point or a group of points differs from other points or other groups of points at least with respect to one optical property, for example the brightness or the color of the point. Similar to phase-measuring deflectometry, this creates a pattern which, when observed with a camera over a reflective surface of a body, allows unambiguous inferences about the position of an observed point or an observed group of points within the pattern (or a subregion of the pattern).

At least a portion of this pattern is reflected by a reflective surface of the object as a reflected pattern onto a detector of a camera unit. The detector of the camera unit converts the received reflected pattern into a camera image, which typically consists of a plurality of pixels arranged in columns and rows. Together with the pattern produced by the pattern generator, this camera image forms a starting point for determining geometric properties of the reflective surface of the object.

A relationship between points of the camera image and corresponding points of the pattern can be described mathematically by means of a correspondence function, in particular by means of a ($\mathbb{R}^2 \rightarrow \mathbb{R}^2$) correspondence function. This correspondence function depends on geometric properties of the reflective surface of the object, i.e. the pattern provided by the pattern generator is mapped in different ways and at different locations of the detector of the camera unit depending on the configuration of the reflective surface, which is reflected in the correspondence function. In the case of a curved object, for example, a straight line of the pattern is mapped to a curve, the curvature of which depends on the curvature of the surface, the beam direction of the reflected pattern and other optical conditions. Thus, if parameters of the correspondence function are known, geometric properties of the reflective surface can be inferred. It is advantageous if the correspondence function is determined in a suitably to be defined local surrounding area of each individual measuring point and is biunique; global bijectivity over the entire field of measurement is not required.

To determine at least one of the geometric properties of the reflective surface of the object, differential geometric properties of a transformation respectively given locally by the correspondence function are used. This means that the correspondence function is derived locally at least once and information about the geometric nature of the reflective surface is obtained from a consideration of the correspondence function and its derivative(s).

Based on the two-dimensional pattern and the configuration according to the invention of a distinguishability of points or groups of points, a point of a camera image can be assigned to a point of the pattern and therefore a two-dimensional area of the camera image can be assigned to a (correspondingly distorted) area of the pattern on the screen of the pattern generator and parameters of the correspondence function and/or differential geometric properties of a transformation given by the correspondence function can be calculated therefrom.

The correspondence function can be represented locally in the form of a Taylor expansion (or other suitable polynomial approximation), for example. In the case of local approximation up to the second order, this representation can, for example, be carried out using 10 parameters to be determined, 4 parameters $a_{11}, a_{12}, a_{21}, a_{22}$ for the Jacobian matrix (1st order) and 6 parameters $a_{13}, a_{14}, a_{15}, a_{23}, a_{24}, a_{25}$ for the Hessian matrix (2nd order):

$$\begin{pmatrix} x' \\ y' \end{pmatrix} = A \cdot \begin{pmatrix} x \\ y \\ xx \\ xy \\ yy \end{pmatrix} \quad mitA = \begin{pmatrix} a_{11} & a_{12} & a_{13} & a_{14} & a_{15} \\ a_{21} & a_{22} & a_{23} & a_{24} & a_{25} \end{pmatrix}$$

The length of the line of sight to the surface can be determined by solving a non-linear system of equations with 4 unknowns (one parameter s for the zeroth order, i.e. the position of the object point in space along the respective line of sight of the camera, and 3 parameters a, b, c for the second order, i.e. the second fundamental shape of the object surface). The special feature in this configuration is the determination of the coefficients of the Taylor expansion of the correspondence function (also referred to here as the "transformation"), which is present using methods of phase-measuring deflectometry or other suitable pattern encoding at each point to be evaluated in the form of full-surface measurement data in a suitably to be defined local surrounding area and thus permits the determination of the (for example 10) parameters of the above-described transformation using an overdetermined system of equations in the form of a least square fit on this local surrounding area.

In principle, the method according to the invention can be used for a wide variety of objects that have a specular and/or partially specular surface. "Specular surface" means that a light ray incident at an angle of incidence is reflected with an angle of reflection that corresponds to the angle of incidence—in each case relative to the surface normal. This reflection is also referred to as "direct reflection". "Partially specular surface" means that, in addition to directly reflected portions, portions of the incident light ray are also reflected diffusely. This means that the angle of reflection of the diffusely reflected portions differs from the angles of incidence relative to the surface normal. The size of the portion of directly and diffusely reflected rays for a partially specular surface is of minor importance. Important is only that the directly reflected portions of rays can be mapped to the detector of the camera unit in a sufficiently distinguishable manner. Since the diffusely reflected portion is not needed for evaluation in the method according to the invention, unlike in EP 1 837 623 A1, there is no need to impose further conditions upon it. It can therefore also be as weak as desired.

The pattern generator, too, can be implemented in a wide variety of ways. It is essential that the pattern produced by the pattern generator can be produced in a reproducible manner, i.e. that the display of a pattern at different times is unchanged. This can be achieved with a variety of pattern generators known from practice. To name just a few useful, but not limited to these, pattern generators, solely as an example, reference is made to the use of TFT (thin-film transistor), OLED (organic light emitting diode), LCD (liquid crystal display) or plasma screens or the projection of the pattern onto a screen or frosted glass.

The camera unit can likewise be formed in a wide variety of ways. It is essential that the camera unit can convert a pattern reflected onto the detector into a camera image. In this context, it is advisable that the mapping optics, the detector and other elements of the camera unit be of such high quality that the camera image obtained by the detector displays the reflected pattern with as little distortion as possible. Less high-quality components can be appropriately calibrated using standard near-field photogrammetry procedures. In addition, in particular for use in manufacturing facilities, it is advisable for the camera unit to be appropriately robust and suitable for industrial use.

For both the pattern generator and the camera unit, it is advisable that they respectively consist of calibrated units. This means that distortions that occur when a pattern is produced or when a reflected pattern is mapped in a camera image, or changes in the color reproduction, can be measured and used for error correction. Appropriate calibration methods are well known from practice.

The method according to the invention can in principle be used to determine a variety of geometric properties of the reflective surface. It is important that the geometric property is at least indirectly reflected in the camera image and the correspondence function. The geometric property of the reflective surface of the object preferably consists of height information and/or inclination information and/or curvature information. The height information is an (absolute) position of a point of the reflective surface at which a light ray emanating from the pattern is reflected to a detector. This height information can in particular be given by a distance s between the point of the reflective surface and the illuminated point on the detector of the camera unit (or also the camera center in the case of calibration using an extended pinhole camera model). Inclination information can be calculated from the height information using a first derivative, curvature information can be calculated from the height information using a second derivative.

In a further development, in calibrated systems, the inclination information can be determined with high precision via a "classic" deflectometric evaluation by ray tracing using height information s determined according to the invention along a line of sight known from the calibration, thus improving the overall precision of the measurement. The height information can then also be improved up to self-consistency by iterative integration.

In one configuration, a calculation of parameters of the correspondence function and/or a calculation of differential geometric properties of a transformation given by the correspondence function for a point of a camera image uses a surrounding area of this point in the camera image. In a further development, the "size" of the surrounding area can be made dependent on the curvature of the object. The stronger the curvature of the reflective surface, the smaller the size of the selected surrounding area could be. A surrounding area can consist of a 3×3 matrix, for example, whereby the point of the camera image defining the surrounding area is disposed in the middle element (2 2) and the direct neighbors of the point are disposed on the remaining points (there would consequently be 2×9=18 measurement values available for the determination of 10 parameters of a local transformation which is approximated by means of a Taylor expansion and describes the correspondence function up to the second order). 5×5 matrices or larger surrounding areas would be conceivable as well.

In a further development, curves that are defined by a plurality of points of a surrounding area of a point of the camera image can be mathematically approximated. Such curves could, for example, be formed by a column or a row of the aforementioned matrix representation. A variety of approximation means known from practice can be used for a mathematical approximation. The use of a Taylor expansion is preferred.

In one configuration, the curves defined by a plurality of points of a surrounding area of a point of the camera image are formed by straight lines. If it is assumed that the correspondence function maps points of a camera image to points of the pattern, then, in the case of an object having a curved reflective surface, the straight lines in the camera image would be mapped to a curved curve in the pattern. In this way, as utilized in the aforementioned publication by Savarese, an evaluation of any number of pairs of curves can be carried out for each measuring point in the camera image. In a further development, the configuration according to the invention of the pattern makes it possible to determine a corresponding curve of the pattern when calculating the parameters of a correspondence function and/or when calculating differential geometric properties of a transformation given by the correspondence function for a curve in the camera image. The corresponding curve of the pattern is defined by the points of the pattern which, after being reflected on the reflective surface of the object, produce the considered curve in the camera image. Since points or groups of points can be distinguished from one another by the optical properties of the pattern, such an assignment is generally possible without problems. It is thus possible to carry out a full-surface calculation of the position of each pattern point. The original images of the correspondence function, i.e. the curves in the camera image, can be arbitrarily arranged coordinate lines in the chip plane of the detector, for example. The images of the correspondence function are then the resulting (usually curved) curves of the respective observed points of the pattern. It is thus possible to avoid locally unfavorable curve geometries, as described in S. Savarese et al. "Local Shape from Mirror Reflections", International Journal of Computer Vision, 64(1), 31-67 (2005), when using fixedly predetermined curves on the pattern.

The optical properties that vary within the pattern can in principle be formed in a variety of ways. It is essential that the respective optical properties are reflected in the camera image and that inferences about a light ray producing point of the pattern can be made as unambiguously as possible. What these optical properties consist of is not important. However, the optical properties preferably consist of the brightness and/or color of the points of the pattern. If the pattern is formed by gray values, for example, these optical properties would be different brightnesses of the points of the pattern. In accordance with the color space used, for example 256 different gray levels (including white and black), it is thus possible to display a multitude of distinguishable points or groups of points. Different brightnesses of a color would be conceivable as well, for example differently bright shades of green or blue. The optical property can also consist of a color. A color curve over a series of adjacent pattern points can be used, for example a color curve from yellow to green to blue. It is thus possible to distinguish an even larger number of different points or groups of points. If the two mentioned approaches are additionally combined, i.e. different brightnesses and different colors, the distinguishable number of points or groups of points can be increased further.

In a further development, groups of points of the pattern having identical optical properties can be formed by adjacent points. Such adjacent points can, for example, form a curve. These curves can in principle be as curved as desired and as wide as desired. However, these curves are preferably formed by straight lines which are narrow, particularly preferably less than 1 cm, very particularly preferably less than 3 mm.

In a further development, the optical properties within the pattern are changed quasi-continuously. This means that the change in the optical property is so slight that a viewer perceives it as a continuous transition. The use of a sinusoidal curve is preferred. The quasi-continuous change can also be limited to subregions, for example to a stripe or a square.

The pattern can in principle be formed in a vast variety of ways. The pattern can be configured such that every individual point of the entire pattern can be distinguished from another point of the pattern. A biunique association between camera image and pattern is thus possible. However, this usually means that the differences between individual points are very close to one another. For a large number of distinguishable points, this can mean that the differences are practically no longer resolvable by measurement. Therefore, in a further development, subregions are formed in the patterns, within which the optical properties of the pattern change. This makes it possible to limit the variation bandwidth of the optical property/properties to a small subregion of the pattern. It can be useful if the individual subregions are structured identically to one another or comprise sections of the subregions. The thus occurring ambiguity between different subregions can usually be dealt with easily, for example using so-called phase unwrap processes.

The individual subregions of the pattern can be arranged relative to one another in different ways. To simplify pattern generation, however, the subregions are preferably arranged in a grid. This grid can comprise differently structured grid elements. Since the overall pattern should be two-dimensional, however, the grid elements should ensure that a two-dimensional overall pattern can be created, i.e. the grid elements should be able to be lined up without gaps. Preferred configurations of the grid elements are squares, rectangles, triangles and hexagons. However, more complex grid elements can also be used.

The overall pattern or a subregion of the pattern can in turn be structured in a variety of ways. In one configuration, the pattern is an inverse pattern adapted to the object to be measured and/or a (band-limited) stochastic pattern and/or a color-coded pattern and/or a fringe pattern having a brightness and/or color curve. Suitable patterns are known from practice.

In a further development, the pattern is produced in such a way that the screen coordinates are encoded in the pattern within the framework of a phase encoding known from deflectometry. In particular when using a phase-shifted sinusoidal pattern or the superposition of two sine waves and the subsequent demodulation of the reconstructed phase (resolving the phase jumps), the phase of the sinusoidal pattern directly encodes the screen coordinates (as known from phase-shifting deflectometry).

In one configuration, the pattern is configured such that geometric properties of the reflective surface of the object can be determined from a single pattern and a single camera image. In another configuration, a plurality of different patterns are produced chronologically one after the other by the pattern generator. In doing so, the plurality of patterns can be phase-shifted relative to one another, rotated by a defined angle (for example 90°), inverted, or correlated to one another in some other way. A calculation of parameters of the correspondence function and/or differential geometric properties of a transformation given by the correspondence function can then be repeated for each one of the plurality of different patterns. With a suitable selection of the plurality of patterns, it may be possible to calculate needed parameters and/or properties in an iterative process even for patterns that do not allow sufficient determination of parameters of the correspondence function or the differential geometric properties. With each iteration, calculations for parameters and/or properties can then be supplemented and/or rendered more precise.

Depending on the number of points in the camera image and depending on the complexity of the reflective surface, the evaluations of the individual points on the reflective surface can become very complex and computationally intensive. Therefore, in a further development, the points in the camera image are deliberately subsampled, so that not every camera point or only an averaging of a plurality of camera points is used. The subsampling then creates support points on which an interpolation or regression of a model surface can be carried out. Such a simplified model surface can then be used to determine geometric properties that are at least similar to the real reflective surface.

A system according to the invention for optically measuring an object, that is in particular configured to implement a method according to the invention, comprises a pattern generator, a camera unit and a calculation unit. The pattern generator is configured to produce a two-dimensional pattern which is varied in at least one optical property such that, at least in subregions of the pattern, a plurality of different points or a plurality of different groups of points can be distinguished from one another. The camera unit comprises a detector, wherein at least the parts of the pattern are reflected by a reflective surface of the object as a reflected pattern onto a detector of the camera unit, wherein the detector is configured to convert the reflected pattern into a camera image, and wherein a relationship between points of the camera image and corresponding points of the pattern can be described by means of a correspondence function which is dependent on geometric properties of the reflective surface of the object. This dependence means that parameters of the correspondence function that can be determined by measurement depend on geometric properties of the reflective surface. The calculation unit is configured to determine at least one of the geometric properties of the reflective surface of the object, whereby, i.e. when determining geometric properties, differential geometric properties of a transformation given by the correspondence function are used.

In principle, it is irrelevant how the camera unit and the pattern generator are arranged relative to one another, as long as the pattern generator produces a pattern that can be reflected by a reflective surface of the object onto the detector of the camera unit. This requirement is usually relatively easy to satisfy. It has been shown, however, that certain arrangements can lead to less favorable conditions. Therefore, in a further development of the system according to the invention, the camera unit and the pattern generator (i.e. the surface displaying the pattern) are arranged relative to one another in such a way that the used viewing planes and the pattern generator are not perpendicular to one another. A viewing plane is subtended by a line of sight of the camera unit and a light ray produced by the pattern reflected on the reflective surface of the object. In a perpendicular arrangement of the viewing plane relative to the pattern generator, the target function, which will have to be minimized in the calculations, has only a poorly defined, broad minimum. This is numerically unfavorable and, in the case of noisy measurement data, limits the accuracy of the measurement. In particular in the case of primarily flat objects, this constellation can be avoided by deliberately looking onto the pattern generator with the camera above the object at an oblique angle.

The method according to the invention and the system according to the invention are in principle configured such that only a single camera unit is used. Even in this type of monocular system, a suitably configured pattern makes it possible to determine one or more geometric properties of the reflective surface of the object. If ambiguities occur in a periodic pattern, they can usually be eliminated without difficulty. As an example, in this context, reference is made to corresponding "phase unwrap" methods known in the literature. In a special configuration, such ambiguities caused by periodic patterns can alternatively also be resolved by using the "Frobenius criterion", which, in contrast to the application on the only slightly varying potential normal field (as described in detail in the dissertations of J. Kaminiski or S. B. Werling, mentioned in the introduction to the description), is robustly applicable in this case, because the "candidate normals" calculated from (due to ambiguities) respectively periodically offset screen points typically vary very strongly outside the "real" object surface and thus very clearly violate the local integrability criterion.

In a further development, the system comprises a plurality of camera units disposed spaced apart from one another. Each one of these cameras converts a pattern reflected on a reflective surface of the object into a camera image. For each one of these individual camera images, the geometric properties of the reflective surface of the object can be determined independently of one another. Should ambiguities occur, the results of the evaluations of the different camera images can be combined with one another, thereby reducing or eliminating the ambiguities.

Lastly, it must expressly be noted that the above described design examples serve only to explain the claimed teaching, but do not limit said teaching to these design examples.

The invention claimed is:
1. Method for optically measuring an object having an at least partially specular surface,
wherein, by means of a pattern generator (1), a two-dimensional pattern (13) is produced which is varied in at least one optical property such that, at least in subregions (10), a plurality of different points (p) or a plurality of different groups of points can be distinguished from one another,
wherein at least parts of the pattern (13) are reflected by a reflective surface (2) of the object (3) as a reflected pattern onto a detector (14) of a camera unit (4), wherein the reflected pattern is converted by the detector (14) into a camera image (9), wherein a relationship between points (q) of the camera image (9) and corresponding points (p) of the pattern (13) can be described by means of a correspondence function which is dependent on geometric properties of the reflective surface (2) of the object (3),
wherein at least one of the geometric properties of the reflective surface (2) of the object (3) is determined by using differential geometric properties of a transformation given by the correspondence function, by deriving the correspondence function locally at least once and determining the at least one of the geometric properties of the reflective surface (2) of the object (3) from the correspondence function and its derivative or derivatives, and wherein a calculation of parameters of the correspondence function and/or a calculation of differential geometric properties of a transformation given by the correspondence function for a curve (17) in the camera image (9) includes the determination of a corresponding curve (18) of the pattern (13), wherein the corresponding curve (18) of the pattern (13) is formed by the points of the pattern (13) which, after reflection at the reflective surface (2) of the object (3), produce the curve (17) in the camera image (9).

2. The method according to claim 1, wherein the geometric property of the reflective surface (2) of the object (3) includes at least one of height information or inclination information or curvature information.

3. The method according to claim 1, wherein a calculation of parameters of the correspondence function and/or a calculation of differential geometric properties of a transformation given by the correspondence function for a point (q) of the camera image (9) uses a surrounding area of this point in the camera image (9).

4. The method according to claim 3, wherein a curve (17) defined by a plurality of points of a surrounding area of a point (p) of the camera image (9) is mathematically approximated.

5. The method according to claim 1, wherein the at least one optical property which varies within the pattern (13) consists of the brightness and/or color of the points of the pattern (13) and/or phase of a sinusoidal brightness curve.

6. The method according to claim 1, wherein groups of points of the pattern (13) having identical optical properties are formed by adjacent points arranged on a curve.

7. The method according to claim 1, wherein the optical properties within the pattern (13) are changed quasi-continuously, sinusoidally, at least in subregions (10), so that the points of the pattern are encoded by local phases of a sinusoidal brightness curve.

8. The method according to claim 1, wherein the pattern (13) comprises subregions (10) within which the optical properties of the pattern (13) are varied, wherein the individual subregions (10) are structured identically to one another.

9. The method according to claim 8, wherein the subregions (10) are arranged in a grid, wherein the grid is formed by square, rectangular, triangular or hexagonal grid elements.

10. The method according to claim 1, wherein an inverse pattern and/or a band-limited stochastic pattern and/or a color-coded pattern and/or a fringe pattern having a brightness and/or color curve is used for the pattern (13).

11. The method according to claim 1, wherein the pattern (13) is produced in such a way that screen coordinates are encoded in the pattern (13).

12. Method for optically measuring an object having an at least partially specular surface, wherein, by means of a pattern generator (1), a two-dimensional pattern (13) is produced which is varied in at least one optical property such that, at least in subregions (10), a plurality of different points (p) or a plurality of different groups of points can be distinguished from one another, wherein at least parts of the pattern (13) are reflected by a reflective surface (2) of the object (3) as a reflected pattern onto a detector (14) of a camera unit (4), wherein the reflected pattern is converted by the detector (14) into a camera image (9), wherein a relationship between points (q) of the camera image (9) and corresponding points (p) of the pattern (13) can be described by means of a correspondence function which is dependent on geometric properties of the reflective surface (2) of the object (3), wherein at least one of the geometric properties of the reflective surface (2) of the object (3) is determined by using differential geometric properties of a transformation given by the correspondence function, by deriving the correspondence function locally at least once and determining the at least one of the geometric properties of the reflective surface (2) of the object (3) from the correspondence function and its derivative or derivatives, and wherein a plurality of different patterns (13) are produced one after the other by the pattern generator (1), wherein the plurality of patterns (13) are phase-shifted relative to one another, wherein calculations of parameters of the correspondence function and/or calculations of differential geometric properties of a transformation given by the correspondence function are repeated for the respective pattern (13) of the plurality of patterns, and wherein the plurality of patterns (13) are selected in such a way that calculated parameters and/or the differential geometric properties are supplemented and/or rendered more precise with calculations for one of the plurality of patterns (13).

13. The method according to claim 12, wherein one of:
the geometric property of the reflective surface (2) of the object (3) includes at least one of height information or inclination information or curvature information,
a calculation of parameters of the correspondence function and/or a calculation of differential geometric properties of a transformation given by the correspondence function for a point (q) of the camera image (9) uses a surrounding area of this point in the camera image (9),
the at least one optical property which varies within the pattern (13) consists of the brightness and/or color of the points of the pattern (13) and/or phase of a sinusoidal brightness curve,
groups of points of the pattern (13) having identical optical properties are formed by adjacent points arranged on a curve, or
the optical properties within the pattern (13) are changed quasi-continuously, sinusoidally, at least in subregions (10), so that the points of the pattern are encoded by local phases of a sinusoidal brightness curve.

14. The method according to claim 12, wherein one of:
the pattern (13) comprises subregions (10) within which the optical properties of the pattern (13) are varied, wherein the individual subregions (10) are structured identically to one another,
an inverse pattern and/or a band-limited stochastic pattern and/or a color-coded pattern and/or a fringe pattern having a brightness and/or color curve is used for the pattern (13), or
the pattern (13) is produced in such a way that screen coordinates are encoded in the pattern (13).

15. Method for optically measuring an object having an at least partially specular surface, wherein, by means of a pattern generator (1), a two-dimensional pattern (13) is produced which is varied in at least one optical property such that, at least in subregions (10), a plurality of different points (p) or a plurality of different groups of points can be distinguished from one another, wherein at least parts of the pattern (13) are reflected by a reflective surface (2) of the object (3) as a reflected pattern onto a detector (14) of a camera unit (4), wherein the reflected pattern is converted by the detector (14) into a camera image (9), wherein a relationship between points (q) of the camera image (9) and corresponding points (p) of the pattern (13) can be described by means of a correspondence function which is dependent on geometric properties of the reflective surface (2) of the object (3), wherein at least one of the geometric properties of the reflective surface (2) of the object (3) is determined by using differential geometric properties of a transformation given by the correspondence function, by deriving the correspondence function locally at least once and determining the at least one of the geometric properties of the reflective surface (2) of the object (3) from the correspondence function and its derivative or derivatives, and wherein points in the camera image (9) are subsampled and that an interpolation or regression of a model surface is carried out on support points obtained in this manner.

16. The method according to claim 15, wherein one of:

the geometric property of the reflective surface (2) of the object (3) includes at least one of height information or inclination information or curvature information, a calculation of parameters of the correspondence function and/or a calculation of differential geometric properties of a transformation given by the correspondence function for a point (q) of the camera image (9) uses a surrounding area of this point in the camera image (9), the at least one optical property which varies within the pattern (13) consists of the brightness and/or color of the points of the pattern (13) and/or phase of a sinusoidal brightness curve, groups of points of the pattern (13) having identical optical properties are formed by adjacent points arranged on a curve, or the optical properties within the pattern (13) are changed quasi-continuously, sinusoidally, at least in subregions (10), so that the points of the pattern are encoded by local phases of a sinusoidal brightness curve.

17. The method according to claim 15, wherein one of:

the pattern (13) comprises subregions (10) within which the optical properties of the pattern (13) are varied, wherein the individual subregions (10) are structured identically to one another, an inverse pattern and/or a band-limited stochastic pattern and/or a color-coded pattern and/or a fringe pattern having a brightness and/or color curve is used for the pattern (13), or the pattern (13) is produced in such a way that screen coordinates are encoded in the pattern (13).

18. Method for optically measuring an object having an at least partially specular surface, wherein, by means of a pattern generator (1), a two-dimensional pattern (13) is produced which is varied in at least one optical property such that, at least in subregions (10), a plurality of different points (p) or a plurality of different groups of points can be distinguished from one another, wherein at least parts of the pattern (13) are reflected by a reflective surface (2) of the object (3) as a reflected pattern onto a detector (14) of a camera unit (4), wherein the reflected pattern is converted by the detector (14) into a camera image (9), wherein a relationship between points (q) of the camera image (9) and corresponding points (p) of the pattern (13) can be described by means of a correspondence function which is dependent on geometric properties of the reflective surface (2) of the object (3), wherein at least one of the geometric properties of the reflective surface (2) of the object (3) is determined by using differential geometric properties of a transformation given by the correspondence function, by deriving the correspondence function locally at least once and determining the at least one of the geometric properties of the reflective surface (2) of the object (3) from the correspondence function and its derivative or derivatives, and wherein, in the case of ambiguities in an encoding of the pattern, these are resolved by applying a Frobenius criterion or another suitable local integrability or smoothness criterion on a vector field of potential ambiguity normals created by a periodicity of the pattern.

19. The method according to claim 18, wherein one of:

the geometric property of the reflective surface (2) of the object (3) includes at least one of height information or inclination information or curvature information, a calculation of parameters of the correspondence function and/or a calculation of differential geometric properties of a transformation given by the correspondence function for a point (q) of the camera image (9) uses a surrounding area of this point in the camera image (9), the at least one optical property which varies within the pattern (13) consists of the brightness and/or color of the points of the pattern (13) and/or phase of a sinusoidal brightness curve, groups of points of the pattern (13) having identical optical properties are formed by adjacent points arranged on a curve, or the optical properties within the pattern (13) are changed quasi-continuously, sinusoidally, at least in subregions (10), so that the points of the pattern are encoded by local phases of a sinusoidal brightness curve.

20. The method according to claim 18, wherein one of:

the pattern (13) comprises subregions (10) within which the optical properties of the pattern (13) are varied, wherein the individual subregions (10) are structured identically to one another, an inverse pattern and/or a band-limited stochastic pattern and/or a color-coded pattern and/or a fringe pattern having a brightness and/or color curve is used for the pattern (13), or the pattern (13) is produced in such a way that screen coordinates are encoded in the pattern (13).

* * * * *